United States Patent [19]

Kohno et al.

[11] Patent Number: 4,938,317
[45] Date of Patent: Jul. 3, 1990

[54] CHECK-OUT COUNTER WITH STOPPING ELEMENTS

[75] Inventors: Mitsunori Kohno; Yukuo Kurimoto; Takao Umebara; Hiromasa Akita, all of Shizuoka, Japan

[73] Assignee: Tokyo Electric Company, Ltd., Tokyo, Japan

[21] Appl. No.: 223,029

[22] Filed: Jul. 22, 1988

[30] Foreign Application Priority Data

Jul. 28, 1987 [JP] Japan ............................ 62-115181[U]
Sep. 22, 1987 [JP] Japan ............................ 62-144897[U]

[51] Int. Cl.⁵ ................................................ A47F 9/04
[52] U.S. Cl. ......................................... 186/61; 186/59
[58] Field of Search ...................... 186/59-63, 186/66, 68, 56

[56] References Cited

U.S. PATENT DOCUMENTS

| | | | |
|---|---|---|---|
| 1,510,435 | 9/1924 | Trapp | 52/33 |
| 1,714,745 | 5/1929 | Woerfel | 312/120 |
| 3,076,528 | 2/1963 | Potrafke | 186/68 |
| 4,239,099 | 12/1980 | Williams et al. | |
| 4,369,361 | 1/1983 | Swartz et al. | 235/462 |
| 4,422,745 | 12/1983 | Hopson | 235/462 |
| 4,572,573 | 2/1986 | Yoshikawa et al. | 297/330 |
| 4,652,732 | 3/1987 | Nickl | 235/462 |
| 4,762,984 | 8/1988 | Knowles et al. | 235/383 |
| 4,789,048 | 12/1988 | Cramer et al. | 186/61 |
| 4,838,383 | 6/1989 | Saito et al. | 186/61 |
| 4,853,521 | 8/1989 | Claeys et al. | 235/462 |

FOREIGN PATENT DOCUMENTS

| | | |
|---|---|---|
| 1417485 | 10/1965 | France . |
| 2573297 | 5/1986 | France . |
| 62-154531 | 10/1987 | Japan . |
| 1185855 | 3/1970 | United Kingdom . |
| 2161631 | 1/1986 | United Kingdom . |

*Primary Examiner*—Kevin P. Shaver
*Attorney, Agent, or Firm*—Oblon, Spivak, McClelland, Maier & Neustadt

[57] ABSTRACT

A check-out counter table has a commodity receiving wall which extends leftwardly and rightwardly of a vertical type bar code reader having a reading window formed in a front wall thereof. A stopper adapted to present a high contacting resistance is provided at a location on the commodity receiving wall directly forwardly of the bar code reader on the carrying in side for a basket. When a basket is pulled toward an operator and slipped on the commodity receiving wall, it is always stopped at a fixed position by the stopper.

7 Claims, 3 Drawing Sheets

CHECK-OUT COUNTER WITH STOPPING ELEMENTS

FIELD OF THE INVENTION AND RELATED ART STATEMENT

This invention of a check-out system which is used in a retail store.

DISCUSSION OF THE BACKGROUND

Generally, in a merchandise sales system of the type mentioned, a cash register and/or a vertical type bar code reader making use of a laser beam are provided in front of a cashier or an operator, and a pair of check-out counter tables each having a flat commodity receiving surface formed thereon are disposed on the left and right sides of the bar code reader. Thus, a basket in which commodities are contained is placed on the right-hand side commodity receiving surface while an empty basket is placed on the left-hand side commodity receiving surface, and a commodity is taken out from the right-hand side basket while data of the commodity such as data regarding a price are read by the bar code reader, and then the commodity for which registration has been completed is thrown into the left-hand side basket.

After completion of registration in this manner of data of all of the commodities which have been initially contained in the right-hand side basket, the left-hand side basket is taken away by the customer while the thus emptied right-hand side basket is moved to the left-hand side location by the operator.

With the conventional check-out counter table having such a construction as described above, when data of commodities are to be read, the operation of picking up a commodity from within the right-hand side basket and throwing it into the left-hand side basket must be performed for each of the commodities. Accordingly, it is desirable that the location of the right-hand side basket be always fixed. To this end, care must be taken upon carrying-in of a basket such that it may be placed at a fixed location. Since this operation, however, is performed by hand, it is difficult to place a basket at the fixed location.

An attempt has thus been made to form on a commodity receiving surface convex and concave portions for stopping a basket compulsorily at a fixed location. While this means is effective in stopping a basket at a fixed location, it presents another problem in that it is low in operability in moving a basket due to the fact that, when an emptied basket is moved to the left-hand side location, the convex and concave portions formed on the commodity receiving wall form an obstruction to such movement of the basket.

SUMMARY OF THE INVENTION

It is a first object of the present invention to provide a check-out counter table wherein a basket in which commodities are contained is stopped at a fixed location.

It is a second object of the present invention to provide a check-out counter table wherein a basket in which commodities are contained can be stopped in position only if an operator pulls the basket toward the operator side.

It is a third object of the present invention to provide a check-out counter table wherein a basket stopped in position by a stopper can be moved therefrom readily.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

DESCRIPTION OF THE PREFERRED EMBODIMENTS

Figure 1:
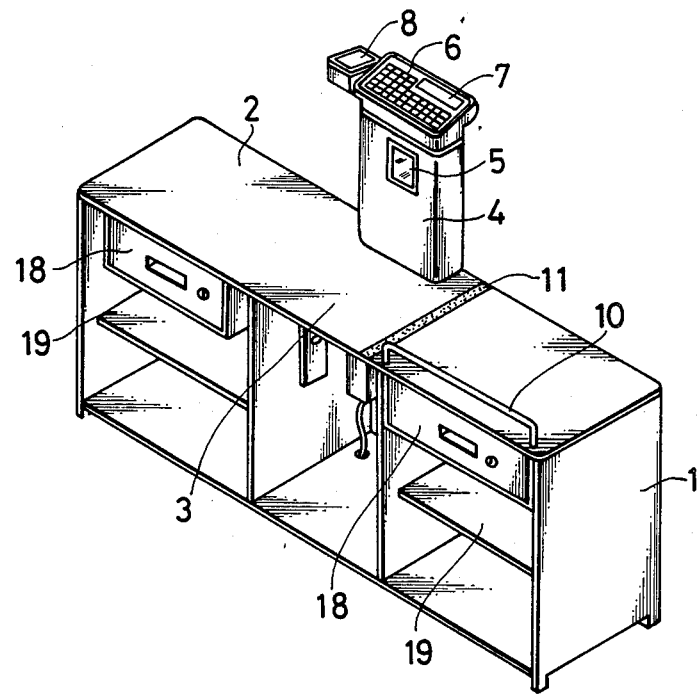
FIG. 1 is a perspective view of a check-out counter table showing a first embodiment of the present invention.
Figure 2:
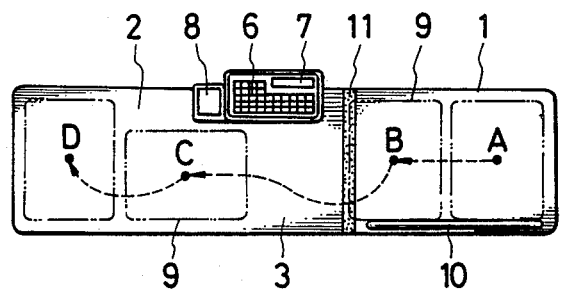
FIG. 2 is a plan view of the check-out counter table of FIG. 1.
Figure 3:
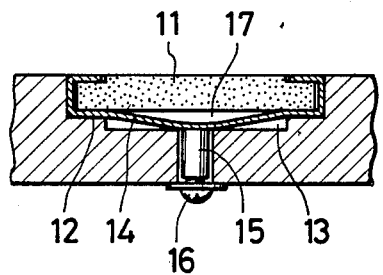
FIG. 3 is an enlarged vertical sectional view showing a stopper of the check-out counter table of FIG. 1.

Referring first to FIGS. 1 to 4, there is shown a check-out counter table of a first embodiment of the present invention. The check-out counter table shown includes a horizontally elongated check-out counter body 1 which has a rectangular commodity receiving surface 2 formed thereon as a flat surface elongated in leftward and rightward directions.

A vertical type bar code reader 4 is provided substantially at a central location of the check-out counter body 1 with a basket passing portion 3 left in front of the check-out counter body 1. The bar code reader 4 has a reading window 5 formed in a front wall thereof through which coded bars printed on a label applied to a commodity are to be read. An operation panel 6 is provided in an inclined relationship to the operator side on the bar code reader, and a display section 7 which may be a liquid crystal display device or the like is provided at a portion of the operation panel 6. Another display section 8 is provided for a customer on the left side of the operation panel 6.

A right-hand side portion of the check-out counter body 1 serves as a carrying-in side by way of which a basket 9 in which commodities are contained is carried to the check-out counter body 1, and a guide rail 10 for preventing such a basket 9 from falling off from the check-out counter body 1 extends in the leftward and rightward directions on the front side of the commodity receiving surface 2 of the carrying-in side of the check-out counter body 1. Meanwhile, a stopper 11 is provided at a location of the commodity receiving surface 2 of the check-out counter body 1 directly forwardly of the bar code reader 4. The stopper 11 is made of an elastic substance such as a rubber material and lies in a substantially the same plane with a surface of the commodity receiving surface 2 so that it provides a high contact resistance to the basket 9. In particular, the check-out counter body 1 has a groove 13 formed in the commodity receiving surface 2 thereof. The groove 13 extends in the forward and rearward directions and has a pair of stepped portions 12 such that it may be deeper at a central portion thereof. The stopper 11 is held in a stopper holding frame 14 made of stainless steel and mounted with the groove 11. A hub 15 is mounted in an integral relationship on the stopper holding frame 14 and is pulled down by means of a machine screw 16 which is mounted in and extends through the commodity receiving surface 2 from the bottom face side of the commodity receiving wall 2 so that the stopper holding frame 14 is secured in position on the stepped portions 12 of the commodity receiving surface 2. The stopper holding frame 14 has a depression at a central portion thereof so that a spacing 17 is formed at a central location below the lower face of the stopper 11.

It is to be noted that a plurality of drawers 18 and racks 19 are provided on the operator side of the check-out counter body 1.

Figure 4:
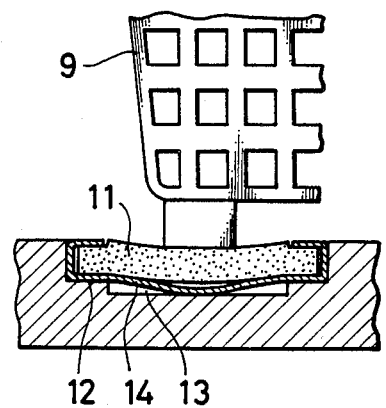
FIG. 4 is a similar view but showing the stopper of FIG. 3 with a basket placed thereon.

With the check-out counter table having this construction, a basket 9 in which commodities are contained is placed on the right-hand side location of the commodity receiving surface 2 of the check-out counter body 1. Actually, the basket 9 is placed at a location A shown in FIG. 2. An operator thus pulls the basket 9 toward the operator side under the guidance of the guide rail 10, and then when the bottom face of the basket 9 is contacted with the stopper 11, the slipping resistance thereof increases suddenly. Accordingly, the position of the basket 9 is always controlled by the stopper 11 and thus is stopped at a fixed location indicated at B in FIG. 2. It is to be noted that, since the location A is vacant then, another basket 9 can be placed at the location A. If the weight of the basket 9 is great, the central portion of the stopper 11 is depressed a little as shown in FIG. 4, thereby promoting the stopping action of the stopper 11.

Meanwhile, an empty basket 9 lies at a location C on the left side of the commodity receiving wall 2, and the operator thus takes out a commodity from the basket 9 on the right side, passes the commodity in front of the reading window 5 of the bar code reader 4, and then throws it into the basket 9 on the left side. Thereupon, coded bars printed on a label applied to the commodity are read out so that various data such as data regarding a price of the commodity is stored in memory.

The commodities for which data have been read out are all transferred into the basket 9 at the location C in this manner. The basket 9 at the location C is then moved by the customer to another location D at which packaging of the commodities or some other operation is conducted. Then, the basket 9 at the location B is moved to the thus vacant location C. Thereupon, however, since the basket 9 is empty with no commodity contained therein, the weight thereof is so small that it can be slipped on the commodity receiving wall 2 of the check-out counter body 1 by a relatively small force although the contacting resistance by the stopper 11 is high. Further, even if the stopper 11 has been deformed in such a manner as shown in FIG. 4, the degree of deformation thereof is reduced so that the stopper 11 will not obstruct movement of the basket 9 to the location C.

It is to be noted that while in the embodiment described above the stopper 11 is described formed from an elastic substance, it may otherwise be formed from a material in the form of a sheet only if it presents a high contacting resistance.

Figure 5:
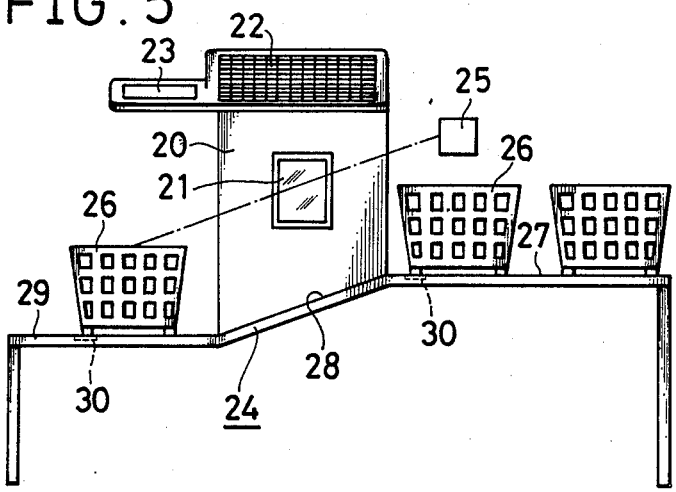
FIG. 5 is a front elevational view of a check-out counter table showing a second embodiment of the present invention.
Figure 6:
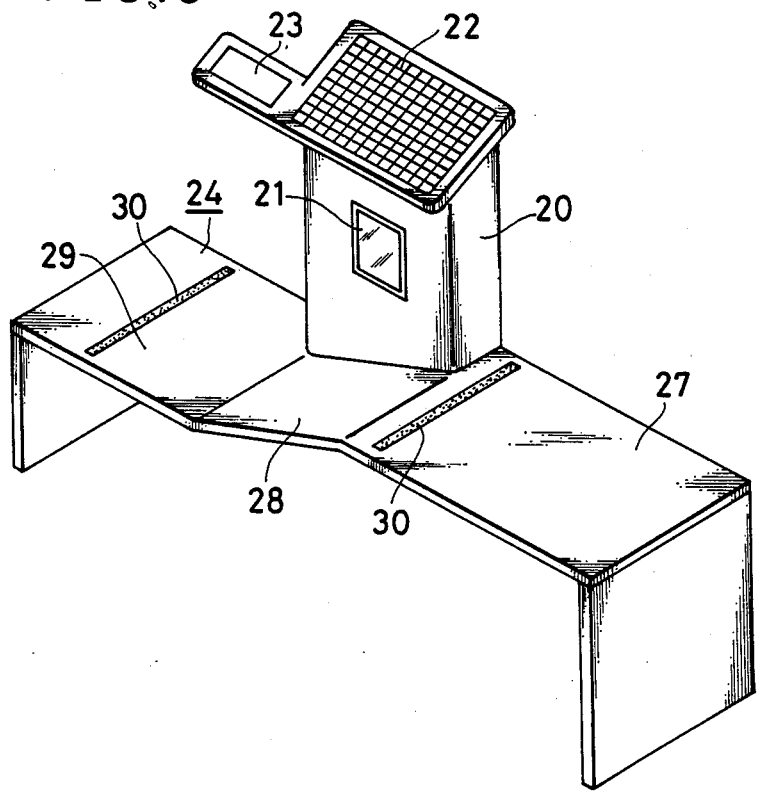
FIG. 6 is a perspective view of the check-out counter table of FIG. 5.

Referring now to FIGS. 5 and 6, there is shown a check-out counter table according to a second embodiment of the present invention. The check-out counter table shown has a vertical stationary type bar code reader 20 provided thereon. The bar code reader 20 has a reading window 21 formed in a front wall thereof and has an operation panel 22 and a display section 23 disposed at an upper wall thereof. The bar code reader 20 is secured to a central portion of a horizontally elongated commodity receiving table 24. The check-out counter table here is designed such that bar code data of a commodity 25 may be read by the bar code reader 20 during movement of the commodity 25 when the commodity 25, picked up from a basket 26 which is placed on one side of the commodity receiving table 24 and in which commodities 25 are contained, is passed in front of the reading window 21 of the bar code reader 20 and put into another empty basket 26 which is placed on the other side of the commodity receiving table 24.

The commodity receiving table 24 includes a flat, upper commodity receiving surface 27 formed on the right-hand side thereof at a relatively high location, a central commodity receiving surface 28 contiguous to the high located commodity receiving surface 27 and inclined downwardly toward the left side, and a flat, lower commodity receiving surface 29 contiguous to the central commodity receiving surface 28 and formed at the left-hand side location thereof.

A pair of stoppers 30 are provided at a left end portion of the high-located commmodity receiving wall 27 and at a left end portion of the low-located commodity receiving wall 29. The stoppers 20 are disposed substantially in the same respective plane with each of the commodity receiving surface 27 and are 29 and adapted to present a high contacting resistance. Each of the stoppers 30 has a similar structure to that of the stopper 11 in the preceding embodiment described hereinabove with reference to FIG. 3.

With the check-out counter table having a construction as described above, a basket 26 in which commodities 25 are contained is placed on the high located commodity receiving surface 27 of the commodity receiving table 24. In this instance, the customer waiting for check-out stands at a location outside the high located commodity receiving surface 27 of the commodity receiving table 24, and when the time for check-out arrives for the customer, the basket 26 is slidably moved to a location on the upper commodity receiving surface 27 near the central commodity receiving ramp or surface 28. Thereupon, an end of a lower portion of the basket 26 rides on the stopper 30 which presents a high contacting friction so that the sliding resistance increases suddenly. Accordingly, the basket 26 will be at once even if it is slidably moved inadvertently, and hence an accident can be prevented where the basket 26 may fall down toward the downwardly inclined central commodity receiving ramp 28 so that the commodities 25 therein are scattered. Meanwhile, the stopper 30 is deformed downwardly in response to an amount of the commodities 25 within the basket 26, that is, in response to the total weight of the commodities 25. Then, if a commodity 25 is taken out from the basket 26 on the high-located commodity receiving table 27 of the commodity receiving table 24, moved linearly while being inclined downwardly and then put into the basket 26 on the low-located commodity receiving wall 29, bar code data of the commodity 25 is read out by the bar code reader 20 when it passes in front of the reading window 21.

Since data is read out from the commodity 25 in this manner while it is moved downwardly as it is acted upon by the gravity, fatigue of an arm of an operator can be reduced, and the efficiency in reading operation can be improved. Then, the basket 26 in which the commodities 25 for which data have been read are contained is moved toward the outer end side of the low-located commodity receiving wall 29 of the commodity receiving table 24 and then taken away from the commodity receiving table 24. Also in this instance, the basket 26 may slip onto the lower commodity receiving surface 29. But, since the stopper 30 thereupon stops the basket 26 at a predetermined location as described hereinabove, the basket 26 will not drop from the commodity receiving table 24. Meanwhile, since the empties basket 26 remaining on the high-located commodity receiving wall 27 of the commodity receiving table 24 is now light in weight and has reduced frictional resistance with respect to the stopper 30, it can be readily slipped over the stopper 30 when it is to be subsequently moved toward the low-located commodity receiving wall 29.

It is to be noted that the central commodity receiving surface 29 of the commodity applying table 24 may otherwise be set at the same level with the low-located commodity receiving surface 29 with its right end connected to the high located commodity receiving surface 27 by means of a vertical wall. Further, the bar code reader 20 may otherwise be formed in an integral relationship with the commodity receiving table 24 or else be formed independently of and mounted on the central commodity receiving ramp 28 or else may be provided independently of the commodity receiving table 24.

Obviously, numerous modifications and variations of the present invention are possible in light of the above teachings. It is therefore to be understood that within the scope of the appended claims, the invention may be practiced otherwise than as specifically described herein.

What is claimed is:

1. A check-out counter table upon which a basket is placed, comprising:
    a vertical type bar code reader having a reading window formed in a front wall thereof,
    a stationary commodity receiving surface extending on opposite sides of said bar code reader, and
    first stopper means mounted in a recessed portion of said commodity receiving surface for presenting a slipping resistance surface which lies in substantially the same plane as said commodity receiving surface so as to provide slipping resistance with a bottom portion of said basket when passed over said surface of said stopper means and which is located forward of said bar code reader.

2. A check-out counter table according to claim 1, which comprises second stopper means for providing a high contacting resistance for stopping the basket at a fixed location and which is provided on an exit side of said bar code reader for the basket on said commodity receiving surface.

3. A check-out counter table according to claim 2, wherein said second stopper means is disposed in substantially the same plane as said commodity receiving surface.

4. A check-out counter table, comprising:
    a bar code reading having a reading window formed in a surface thereof,
    a commodity receiving table having a stationary central commodity receiving surface located on a front side of said bar code reader, a stationary upper receiving surface contiguous to a first side of said central commodity receiving surface,
    a stationary lower commodity receiving surface contiguous to a second side of said central commodity receiving surface and located at a lower position than said upper commodity receiving surface, and
    first stopper means located at least at an end portion of said upper commodity receiving surface and adjacent said central commodity receiving surface for contacting with a basket placed on said upper commodity receiving surface and within which commodities are contained.

5. A check-out counter table according to claim 4, which comprises second stopper means for presenting a high contacting resistance for stopping the basket at a fixed location and which is provided on said lower commodity receiving surface of said commodity receiving table.

6. A check-out counter table according to claim 4, wherein said central commodity receiving surface of said commodity receiving table is inclined downwardly from said upper commodity receiving wall toward said lower commodity receiving wall.

7. A check-out counter table, comprising:
    a bar code reader having a reading window formed on a surface thereof,
    a commodity receiving table having a central commodity receiving surface located on a front side of said bar code reader, an upper receiving surface contiguous to a first side of said central commodity receiving surface, and
    a lower commodity receiving surface contiguous to a second side of said central commodity receiving surface and located at a lower position than said upper commodity receiving surface,
    first stopper means located at least at an end portion of said upper commodity receiving surface and adjacent said central commodity receiving surface for contacting with a basket placed on said upper commodity receiving surface and within which commodities are contained, and
    second stopper means for presenting contacting resistance for stopping the basket at a fixed location and which is provided on said lower commodity receiving surface of said commodity receiving table wherein said first stopper means comprises an elastic member and wherein a spacing is formed at a central location between a lower face of one of said first and second stopper means and one of said upper and lower receiving surfaces.

* * * * *